United States Patent
Hiki

(10) Patent No.: US 7,662,120 B2
(45) Date of Patent: Feb. 16, 2010

(54) CURVED GUIDE MECHANISM AND WALK-ASSISTING DEVICE

(75) Inventor: Yutaka Hiki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/336,883

(22) Filed: Dec. 17, 2008

(65) Prior Publication Data

US 2009/0163328 A1  Jun. 25, 2009

(30) Foreign Application Priority Data

Dec. 19, 2007 (JP) ............................. 2007-327012

(51) Int. Cl.
*A61F 5/00* (2006.01)
(52) U.S. Cl. ...................... 602/16; 602/20; 602/23; 602/27
(58) Field of Classification Search ............... 602/5, 602/16, 20, 23, 26–27; 128/882
See application file for complete search history.

(56) References Cited

U.S. PATENT DOCUMENTS

| | | | | |
|---|---|---|---|---|
| 440,694 A | * | 11/1890 | Yagn | 228/133 |
| 2,111,018 A | * | 3/1938 | Ahler | 623/26 |
| 4,872,665 A | * | 10/1989 | Chareire | 482/51 |
| 5,743,837 A | * | 4/1998 | Dias et al. | 482/124 |
| 7,297,090 B2 | * | 11/2007 | Torres | 482/74 |

FOREIGN PATENT DOCUMENTS

JP   2007-020909   2/2007

* cited by examiner

*Primary Examiner*—Michael A. Brown
(74) *Attorney, Agent, or Firm*—Rankin, Hill & Clark LLP

(57) ABSTRACT

A curved guide mechanism includes a guide unit having an arcuate guide track, and a movable body movably engaged with the guide track via a plurality of engagement elements. The guide track is constituted by a guide groove formed in the guide unit. The movable body is provided with at least three engagement elements including inner engagement elements movably engaged with an inner peripheral rail portion formed on the inner peripheral side of the guide groove, and an outer engagement element movably engaged with an outer peripheral rail portion formed on the outer peripheral side of the guide groove. The engagement elements are spaced apart from one another in a longitudinal direction of the guide groove.

5 Claims, 6 Drawing Sheets

CURVED GUIDE MECHANISM AND WALK-ASSISTING DEVICE

BACKGROUND OF THE INVENTION

1. Field of the Invention

The present invention relates a curved guide mechanism which guides a movable body along an arcuate guide track, and a walk-assisting device using this guide mechanism.

2. Description of the Related Art

In the related art, as this type of walk-assisting device, one including a seating member on which a user sits down in a straddling posture and a leg link supporting the seating member from below, and adapted to receive at least a portion of user's weight via the seating member by a leg link, thereby reducing a load acting on the user's leg to assist in his or her walking is known (for example, refer to Japanese Patent Application Laid-Open No. 2007-20909).

In this walk-assisting device, the seating member and the leg link are connected together via a curved guide mechanism composed of a guide unit and a movable body. The guide unit has an arcuate guide track and is connected to the seating member. The arcuate guide track has a center of curvature located above the seating member and is long in a front-back direction. The movable body is fixed to the leg link and is movably engaged with the guide track via a plurality of engagement elements comprised of rotating bodies. Therefore, the leg link is rockable in the front-back directions with the center of curvature of an arcuate shape which is the shape of the guide track as a rocking fulcrum. According to this configuration, in a case where a point of action of the weight of user's upper body relative to the seating member deviates forward of a rocking fulcrum in the front-back directions of the leg link, and the seating member inclines forward and downward, the rocking fulcrum in the front-back directions of the leg link is located above the seating member. Therefore, the weight acting point is shifted rearward below the rocking fulcrum in the front-back directions of the leg link, the distance in the front-back directions between this fulcrum and the weight acting point decreases, and a rotation moment which acts on the seating member also decreases. Also, the rotation moment which acts on the seating member becomes zero in a place where the weight acting point has been shifted to a position just below the rocking fulcrum in the front-back directions of the leg link, and the seating member is stabilized in this state. Thus, since the seating member automatically converges into a stable state thereof, the seating member can be kept from deviating in the front-back directions below a user's hip.

Here, in the above related-art example, an arcuate rail used as a guide track is fixed to the guide unit, and an inner engagement element and an outer engagement element which are rotatably engaged with an inner peripheral side edge (upper edge) near the center of curvature of the arcuate shape and an outer peripheral rail side edge (lower edge) distant from the center of curvature are provided at front and rear ends, respectively, of the movable body. Therefore, the width of the movable body in an up-down direction becomes a dimension obtained by adding the diameter of the inner engagement element and the outer engagement element to the width of the rail in the up-down direction. As a result, there is a problem such that the movable body becomes large and heavy, and the inertia moment of the leg link increases. Additionally, foreign matters, such as trousers, unfavorably enter into a space between a side edge of the rail and an engagement element engaged therewith to be squeezed in the space, and the smoothness of rocking motion of the leg link might be impaired.

SUMMARY OF THE INVENTION

In view of the aforementioned problems, an object of the invention is to provide a curved guide mechanism adapted to be capable of making a movable body small in size and light in weight, and suppressing biting of foreign matters, and a walk-assisting device using this guide mechanism.

A curved guide mechanism of the present invention includes a guide unit having an arcuate guide track, and a movable body movably engaged with the guide track via a plurality of engagement elements. Here, the guide track includes a guide groove formed in the guide unit. The movable body is provided with at least three engagement elements including an inner engagement element movably engaged with an inner peripheral rail portion formed on the inner peripheral side near a center of curvature of the arcuate shape of the guide groove, and an outer engagement element movably engaged with an outer peripheral rail portion formed on the outer peripheral side distant from the center of curvature of the arcuate shape of the guide groove. The engagement elements are spaced apart from one another in a longitudinal direction of the guide groove.

Additionally, a walk-assisting device of the invention includes a seating member on which a user sits down in a straddling posture, and a leg link supporting the seating member from below. The seating member and the leg link are connected together via a curved guide mechanism including a guide unit connected to the seating member and having an arcuate guide track which has a center of curvature above the seating member, and is long in front-back directions, and a movable body movably engaged with the guide track via a plurality of engagement elements, and connected to an upper end of the leg link. The curved guide mechanism is constituted by the curved guide mechanism of the present invention.

According to the curved guide mechanism of the present invention, in a case where the number of engagement elements is three, two inner engagement elements and one outer engagement element or one inner engagement element and two outer engagement elements are provided. In any case, the movable body is engaged with the guide groove via these engagement elements without any play and rattling, and moves smoothly along the guide groove.

Meanwhile, it is also considered that an inner engagement element and an outer engagement element are provided in the same position in the longitudinal direction of the guide groove in the movable body. In this case, however, it is necessary to set the groove width of the guide groove to be greater than the total dimension of the diameter of the inner engagement element, the diameter of the outer engagement element, and a clearance required for prevention of contact between both engagement elements. As a result, the groove width of the guide groove becomes large, and thus, foreign matters, such as trousers, may be apt to enter into the guide groove, and the width of the movable body also becomes large. As a result, the movable body cannot be appreciably made small in size and light in weight. In contrast, according to the curved guide mechanism of the present invention, the inner engagement element and the outer engagement element are separated in the longitudinal direction of the guide groove. Therefore, the inner engagement element and the outer engagement element may be arranged so as to overlap each other within the groove width of the guide groove. Accordingly, it is sufficient if the groove width of the guide groove is a dimension obtained by adding, to the diameter of one engagement element of the inner engagement element and the outer engagement element, a clearance required for preventing this engagement to come into contact with a rail portion opposite to the rail portion to be inherently engaged with this engaging piece. As a result, the groove width of the guide groove can be small enough, and thus foreign matters hardly enter the guide groove, and the movable body can be made as small in size and light in weight as possible.

According to the walk-assisting device of the present invention using such a curved guide mechanism, foreign matters, such as trousers, can be effectively kept away from entering the guide groove, and being bitten into a space between each of the inner and outer engagement element, and each of the inner and outer peripheral rail portions, and the smoothness of rocking of the leg link can be secured. Additionally, since the movable body can be made small in size and light in weight as described above, the inertia moment of the leg link is reduced. This makes it possible to reduce user's sense of resistance by the inertia moment of the leg link when the user advances his/her leg forward.

Additionally, in the curved guide mechanism of the present invention, preferably, the inner engagement elements are respectively provided at one end and the other end of the guide groove of the movable body in the longitudinal direction, and at least one outer engagement element is provided between the inner engagement elements at both the ends. Here, when a moment (moment which acts so as to push in one of the inner engagement element and the outer engagement element into the guide groove and pull out the other one from the guide groove) in a direction orthogonal to the longitudinal direction of the guide groove is applied to the movable body, in order to reduce the force acting between each of the inner and outer engagement elements and each of the inner and outer peripheral rail portions, it is necessary to increase a distance in a direction orthogonal to the longitudinal direction of the guide groove between a place (inner engagement element engaging place) of the inner peripheral rail portion to be engaged with the inner engagement element, and a place (outer engagement element engaging place) of the outer peripheral rail portion to be engaged with the outer engagement element. In a case where the outer engagement elements are provided at both ends of the movable body, and at least one inner engagement element is provided between both the outer engagement elements, the position of the inner engagement element engaging place deviates further outward than the outer engagement element engaging place and the place of the same inner peripheral rail portion in the longitudinal direction of the guide groove, and the distance in a direction orthogonal to the longitudinal direction of the guide groove between the inner engagement element engaging place and the outer engagement element engaging place becomes short. In contrast, if outer engagement elements are provided between inner engagement elements provided at both ends of the movable body as described above, the position of the outer engagement element engaging place deviates further outward than the inner engagement element engaging place and the place of the same outer peripheral rail portion in the longitudinal direction of the guide groove, and the distance in a direction orthogonal to the longitudinal direction of the guide groove between the inner engagement element engaging place and the outer engagement element engaging place becomes long. Therefore, a force acting between each of the inner and outer engagement elements and each of the inner and outer peripheral rail portions can be reduced by a moment in a direction orthogonal to the longitudinal direction of the guide groove, and durability of the engagement elements as well as the rail portions can be improved.

In the walk-assisting device, when a user turns his/her leg outward, a moment in a direction orthogonal to the longitudinal direction of the guide groove is applied to the movable body. Accordingly, even in the walk-assisting device of the invention, durability can be improved by providing the inner engagement elements at one end and the other end, respectively, of the guide groove of the movable body in the longitudinal direction, and providing at least one outer engagement element between the inner engagement elements at both the ends.

Additionally, in the walk-assisting device of the above related-art example, the movable body is arranged so as to be spaced rearward apart from a line which connects the lower end of the leg link, and the center of curvature of the guide track. In this case, user's weight acts on the seating member in a position ahead of the movable body, and a tilt moment in a forward and downward direction is applied to the guide unit via the seating member.

Here, in a case where the inner engagement elements are respectively provided at one end and the other end of the movable body in the longitudinal direction (front-back directions), and at least one outer engagement element is provided between the inner engagement elements at both the ends, the tilt moment applied to the guide unit is received by the pressurization force between the inner engagement element at the front end of the movable body and the inner peripheral rail portion, and the pressurization force between the outer engagement element and the outer peripheral rail portion. This pressurization force becomes small such that the distance in the front-back directions between the inner engagement element at the front end of the movable body and the outer rotating body becomes long. Also, if the outer engagement element is provided in a position which is offset in a direction away from a line which connects a lower end of the leg link, and the center of curvature of the guide track, with respect to a centre position between the inner engagement elements at both ends, i.e., rearward, the above distance becomes long, and consequently the pressurization force becomes small, and durability is improved. In addition, in a case where, the movable body is arranged so as to be spaced forward apart from a line which connects the lower end of the leg link, and the center of curvature of the guide track, the outer engagement element may be provided in a position which is offset forward from the center position between inner engagement elements at both the ends.

DESCRIPTION OF THE PREFERRED EMBODIMENTS

Figure 1:
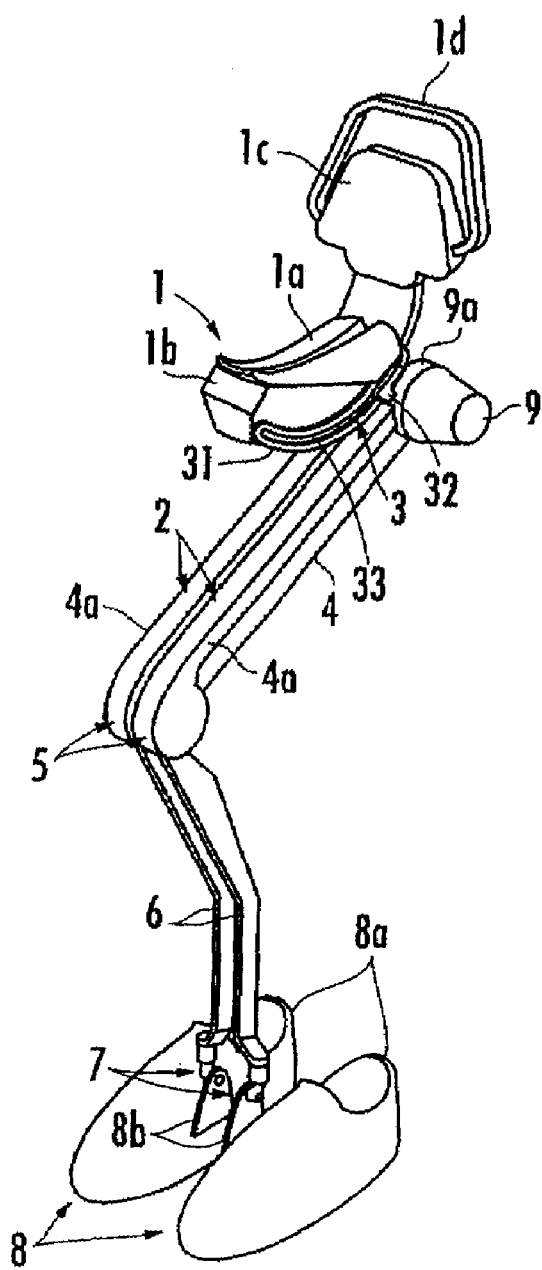
FIG. 1 is a perspective view of a walk-assisting device of a first embodiment of the invention.
Figure 2:
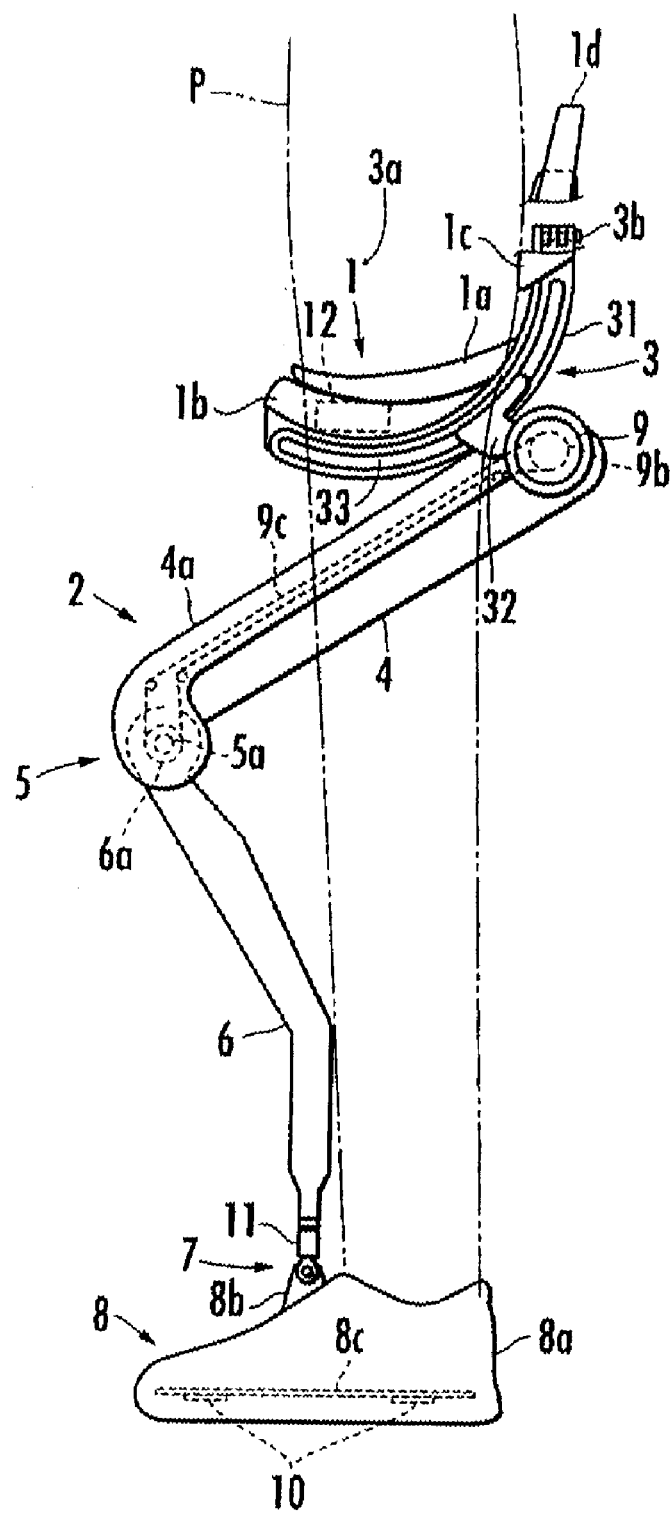
FIG. 2 is a side view of the walk-assisting device of the first embodiment.
Figure 3:
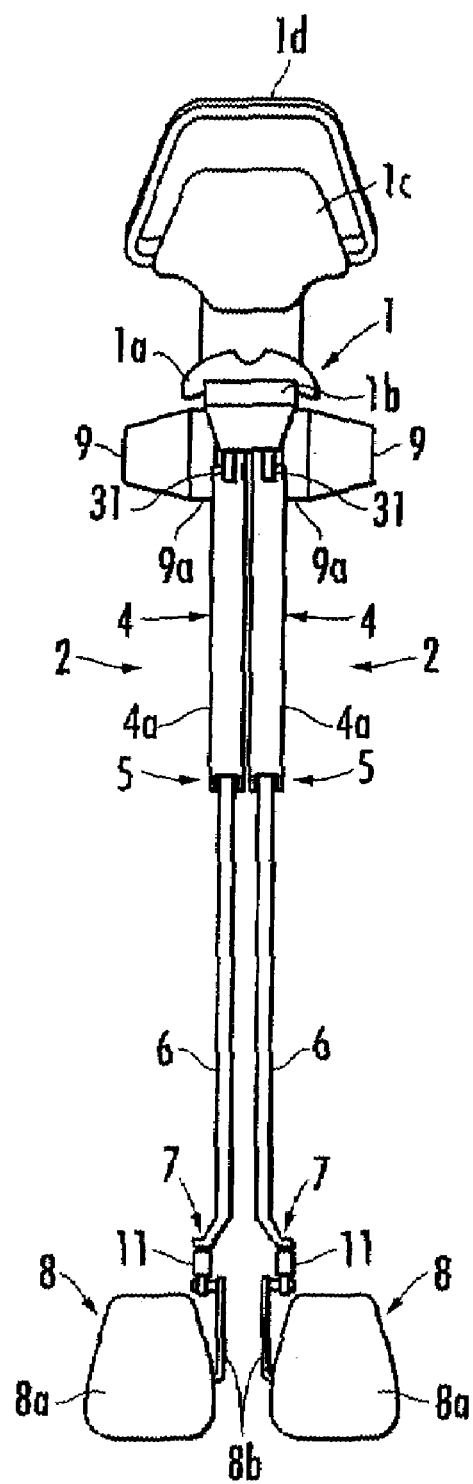
FIG. 3 is a front view of the walk-assisting device of the first embodiment.

Hereinafter, a walk-assisting device of an embodiment of the invention will be described. As shown in FIGS. 1 to 3, the walk-assisting device includes a seating member 1 on which a user P sits down in a straddled posture and a pair of right and left leg links 2 and 2 which support the seating member 1 from below.

Each leg link 2 is constituted by a bendable and stretchable link including a thigh link portion 4 which is connected to the seating member 1 so as to be rockable in the front-back directions via a curved guide mechanism 3 described below, and a lower thigh link portion 6 connected to a lower end of the thigh link portion 4 via a rotary knee joint portion 5. Additionally, a foot mounting portion 8 on which one of the right and left feet of the user P is mounted is connected to a lower end of the lower thigh link portion 6 via an ankle joint portion 7.

Additionally, each leg link 2 is loaded with a drive source 9 for driving the knee joint portion 5. Also, the force in a stretching direction is applied to each leg link 2 by the rotational driving of the knee joint portion 5 by the drive source 9 so that a supporting force (hereinafter referred to a body weight relieving assist force) which supports at least a portion of the weight of the user P may be generated. The body weight relieving assist force generated by each leg link 2 is transmitted to the body of the user P via the seating member 1, and the load which acts on the legs of the user P is reduced.

The drive source 9 is constituted by an electric motor provided with a speed reducer 9a attached to a lateral face of an upper end of the thigh link portion 4. A driving pulley 9b that is an output member of the speed reducer 9a, and a driven pulley 6a fixed to the lower thigh link portion 6 coaxially with a joint axis 5a of the knee joint portion 5 are connected together via a wound transmission members 9c, such as a wire, a chain, and a belt. According to this, the power output via the speed reducer 9a from the drive source 9 is transmitted to the lower thigh link portion 6 via the wound transmission member 9c, the lower thigh link portion 6 rocks about the joint axis 5a relative to the thigh link portion 4, and the leg link 2 is bent and stretched. In addition, a cover 4a which covers the wound transmission member 9c is attached to the thigh link portion 4.

The seating member 1 is constituted by a saddle-like seat portion 1a on which the user P sits down, a holding frame 1b which supports the seat portion 1a from a lower surface, and a waist rest portion 1c attached to a rising portion of a rear end of the holding frame 1b which rises at the rear side of the seat portion 1a. Additionally, the waist rest portion 1c is provided with an arcuate gripping portion 1d which can be gripped by the user P.

Each foot mounting portion 8 includes a shoe 8a, and a connecting member 8b which is fixed to the shoe 8a and extends upward. Also, the lower thigh link portion 6 of each leg link 2 is connected to the connecting member 8b via the ankle joint portion 7 of triaxial structure. Additionally, as shown in FIG. 2, a pair of front and rear pressure sensors 10, 10 which detect the load acted on a middle interphalangeal joint (MP joint) portion and a heel portion of the foot of the user P are attached to a lower face of an insole 8c provided in the shoe 8a. Furthermore, a biaxial force sensor 11 is assembled in the ankle joint portion 7. Detection signals of the pressure sensor 10 and the force sensor 11 are inputted to a controller 12 housed in the holding frame 1b of the seating member 1. On the basis of the signals from the pressure sensor 10 and the force sensor 11, the controller 12 controls the drive source 9 to drive the knee joint portion 5 of the leg link 2, and executes walk-assisting control which generates the above assist force.

Here, the assist force acts on a line (hereinafter referred to as a reference line) which connects a rocking fulcrum 3a in the front-back directions of the leg link 2 relative to the seating member 1, and a rocking fulcrum in the ankle joint portion 7 in the front-back directions of the leg link 2, as seen from a lateral direction. Thus, in the walk-assisting control, an actual assist force (to be exact, a resultant force of an assist force and a force caused by the weight of the seating member 1 and each leg link 2) which acts on the reference line is calculated on the basis of the detection values of forces in biaxial directions detected by the force sensor 11. Additionally, the ratio of a working load of each foot to a full load which acts on both feet of the user P is calculated on the basis of the detection pressure of the pressure sensor 10 of each foot mounting portion 8. Next, a value obtained by multiplying the load ratio of each foot to a setting value of a preset assist force is calculated as a control target value of the assist force to be generated by each leg link 2. Also, the drive source 9 is controlled such that an actual assist force calculated on the basis of the detection value of the force sensor 11 becomes a control target value.

Figure 4:
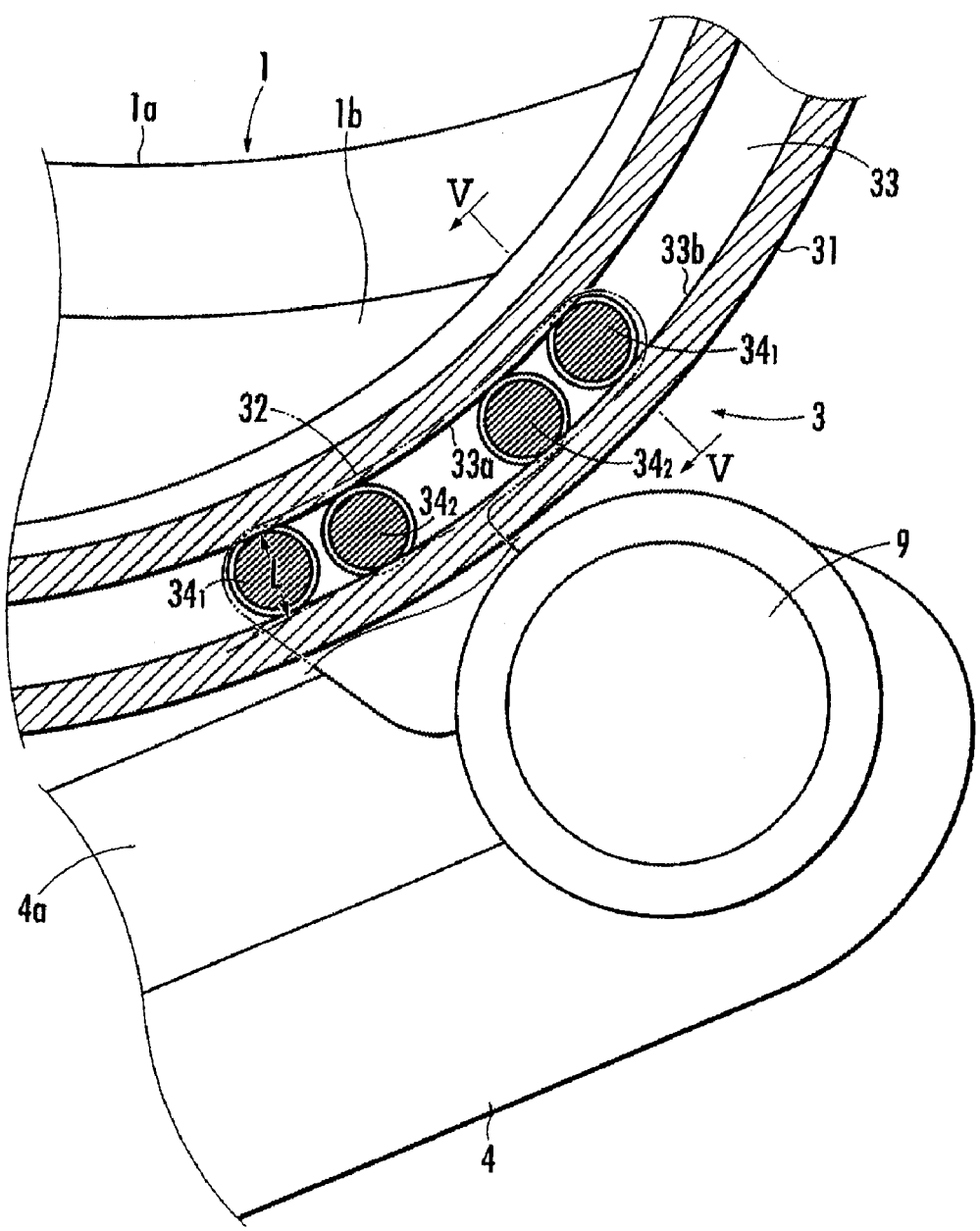
FIG. 4 is a partially cutaway side view of chief parts of the walk-assisting device of the first embodiment.
Figure 5:
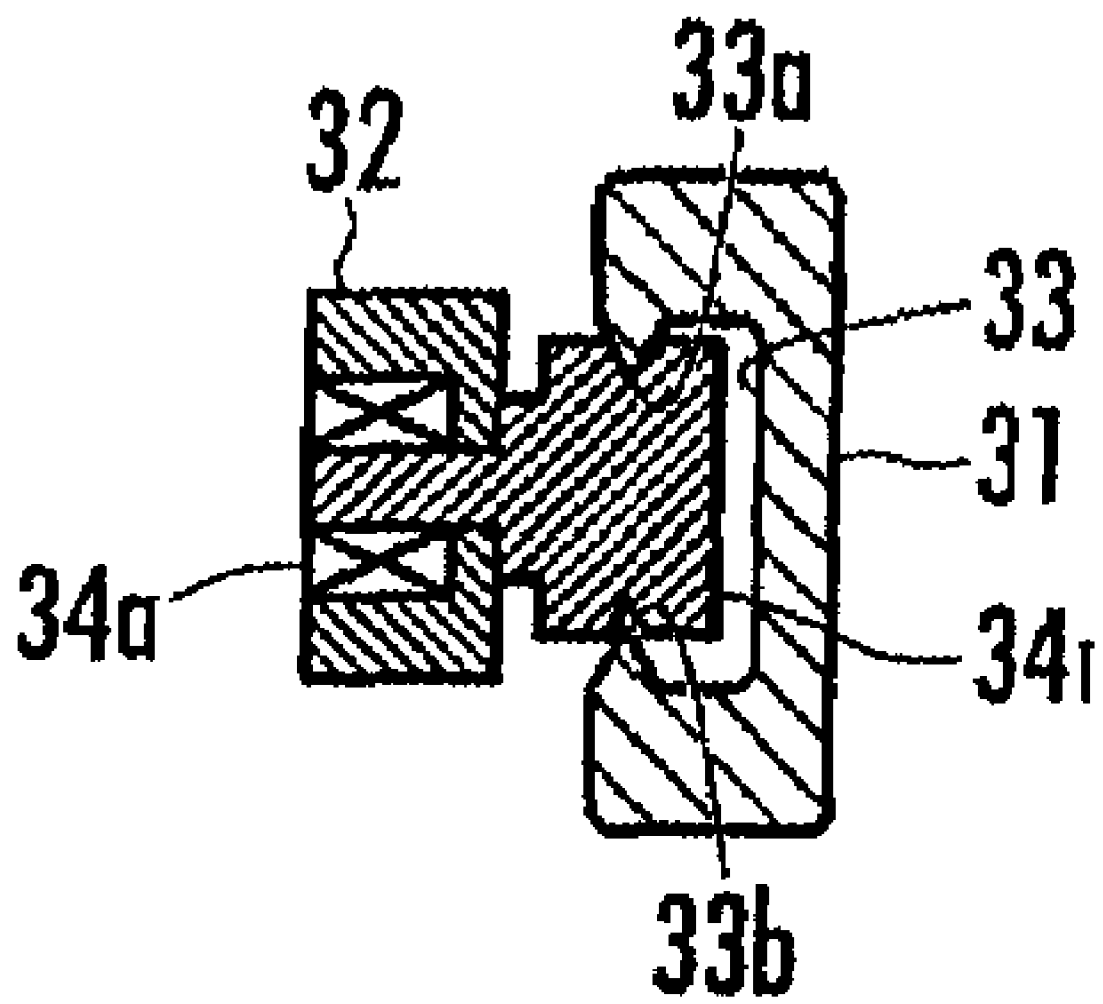
FIG. 5 is a cross-sectional end view taken along the line V-V of FIG. 4.

The curved guide mechanism 3 is constituted by a guide unit 31 connected to the rising portion of the rear end of the holding frame 1b of the seating member 1 via a spindle 3b in the front-back directions so as to be rockable in the lateral direction, and a movable body 32 fixed to an upper end of the thigh link portion 4. The guide body 31 is formed with an arcuate guide groove 33 which is long in the front-back directions and which becomes a guide track. The center of curvature 3a of the arcuate shape of the guide groove 33 is located above an upper face of the seat portion 1a of the seating member 1. Additionally, as shown in FIGS. 4 and 5, an inner peripheral rail portion 33a is formed on the inner peripheral side near the center of curvature 3a of the guide groove 33, and an outer peripheral rail portion 33b is formed on the outer peripheral side far from the center of curvature 3a of the guide groove 33.

Two inner rotating bodies $34_1$, each of which is an engagement element which is movably engaged with the inner peripheral rail portion 33a of the guide groove 33, and two outer rotating bodies $34_2$, each of which is an engagement element which is movably engaged with the outer peripheral rail portion 33b of the guide groove 33 are provided, respectively, in the movable body 32. The respective inner and outer rotating bodies $34_1$ and $34_2$ are pivotally supported in the movable body 32 via a bearing 34a, respectively. According to this construction, the movable body 32 moves smoothly along the guide groove 33 without causing rattling. Also, each leg link 2 rocks in the front-back directions about the center of curvature 3a of the guide groove 33, and consequently, the rocking fulcrum in the front-back directions of each leg link 2 relative to the seating member 1 becomes the center of curvature 3a of the guide groove 33.

In addition, if at least three rotary bodies (engagement elements) comprised of the inner rotating body 341 and the outer rotating body $34_2$, are provided, the movable body 32 is engaged with the guide groove 33 without any play and rattling. Accordingly, it is acceptable to set the number of one of the inner rotating body $34_1$ and the outer rotating body $34_2$ at two and the number of the other at one.

Additionally, since the guide body 31 is rockably connected to the seating member 1 in the lateral direction via the spindle 3b, the leg of the user P can be turned outward. Here, the center of curvature 3a (rocking fulcrum in the front-back directions of the leg link 2) of the guide groove 33 and axis of the spindle 3b are located above the seat portion 1a. Therefore, the seating member 1 can be prevented from tilting largely from right to left or up and down due to the shift of the weight of the user P.

Additionally, in this embodiment, the movable body 32 is arranged so as to be spaced rearward from the line which connects the lower end (ankle joint portion 7) of the leg link 2 and the center of curvature 3a of the guide groove 33, i.e., the above-mentioned reference line. According to this, the forward rocking stroke of the leg link 2 which follows the forward advance of the leg of the user P can be secured without greatly increasing the length of the guide groove 33 forward. As a result, the curved guide mechanism 3 can be made small in its size.

Meanwhile, it is also considered that the inner rotating body $34_1$ and the outer rotating body $34_2$ are provided at the same level in the movable body 32 in the front-back directions (in the longitudinal direction of the guide groove 33). In this case, however, it is necessary to set the groove width of the guide groove 33 to be greater than the total dimension of the diameter of the inner rotating body $34_1$, the diameter of the outer rotating body $34_2$, and a clearance required for preventing any contact between both rotating bodies $34_1$ and $34_2$. As a result, the groove width of the guide groove 33 becomes large, and thus, foreign matters, such as trousers, easily come into guide groove 33, and the dimension of the movable body 32 in the direction of the groove width also becomes large. As a result, the movable body 32 cannot be appreciably made small in size and light in weight.

Thus, in the present embodiment, the inner rotating bodies $34_1$ and $34_1$ are respectively provided at front and rear ends of the movable body 32 and the outer rotating bodies $34_2$ and $34_2$ are respectively provided so as to be spaced inward in the front-back directions apart from the inner rotating bodies $34_1$ and $34_1$. According to this, the inner rotating body $34_1$ and the outer rotating body $34_2$ may be arranged so as to overlap each other within the groove width of the guide groove 33. Accordingly, it is sufficient if the groove width of the guide groove 33 is a dimension obtained by adding, to the diameter of one rotating body of the inner rotating body $34_1$ and the outer rotating body $34_2$, a clearance required for preventing any contact with a rail portion opposite a rail portion to be engaged with this rotating body. Since the groove width of the guide groove 33 can be made small in this manner, foreign matters, such as trousers, can be effectively kept away from entering the guide groove 33, and being bitten into a space between each of the inner and outer rotating bodies $34_1$ and $34_2$ to be squeezed therein, and each of the inner and outer peripheral rail portions 33a and 33b, thereby, the smoothness of rocking of the leg link 2 can be secured. Furthermore, the movable body 32 can be made as small in size and as light in weight as possible. Therefore, the inertia moment of the leg link 2 can be reduced, and user's sense of resistance by the inertia moment of the leg link 2 when the user P advances his/her leg forward can be reduced.

Meanwhile, when the user P turns his/her leg outward, a moment in a direction orthogonal to the longitudinal direction of the guide groove 33 may be applied to the movable body 32, one of the inner rotating body $34_1$ and the outer rotating body $34_2$ may be pushed inward in the lateral direction, and the other one may be pulled outward in the lateral direction. In this case, in order to reduce the force acting between each of the inner and outer rotating bodies $34_1$ and $34_2$ and each of the inner and outer peripheral rail portions 33a and 33b, it is necessary to increase a distance in a direction orthogonal to the longitudinal direction of the guide groove 33 between a place (inner rotating body engaging place) of the inner peripheral rail portion 33a to be engaged with the inner rotating body $34_1$, and a place (outer rotating body engaging place) of the outer peripheral rail portion 33b to be engaged with the outer rotating body $34_2$.

Here, in a case where the outer rotating bodies $34_2$ and $34_2$ are provided at both front and rear ends of the movable body 32, and the inner rotating bodies $34_1$ and $34_1$ are provided between both the outer rotating bodies $34_2$ and $34_2$, the position of the inner rotating body engaging place deviates further outward than the outer rotating body engaging place and the place of the same inner peripheral rail portion 33a in the longitudinal direction of the guide groove 33, and the distance in a direction orthogonal to the longitudinal direction of the guide groove 33 between the inner rotating body engaging place and the outer rotating body engaging place becomes short. In contrast, similarly to this embodiment, if the outer rotating bodies $34_2$ and $34_2$ are provided between the inner rotating bodies $34_1$ and $34_1$ provided at both front and rear ends of the movable body 32, the position of the outer rotating body engaging place deviates further outward than the inner rotating body engaging place and the place of the same outer peripheral rail portion 33b in the longitudinal direction of the guide groove 33, and the distance L in a direction orthogonal to the longitudinal direction of the guide groove 33 between the inner rotating body engaging place and the outer rotating body engaging place becomes long. Therefore, a force acting between each of the inner and outer rotating bodies $34_1$ and $34_2$ and each of the inner and outer peripheral rail portions 33a and 33b decreases by a moment in a direction orthogonal to the longitudinal direction of the guide groove 33, and durability can be improved.

Figure 6:
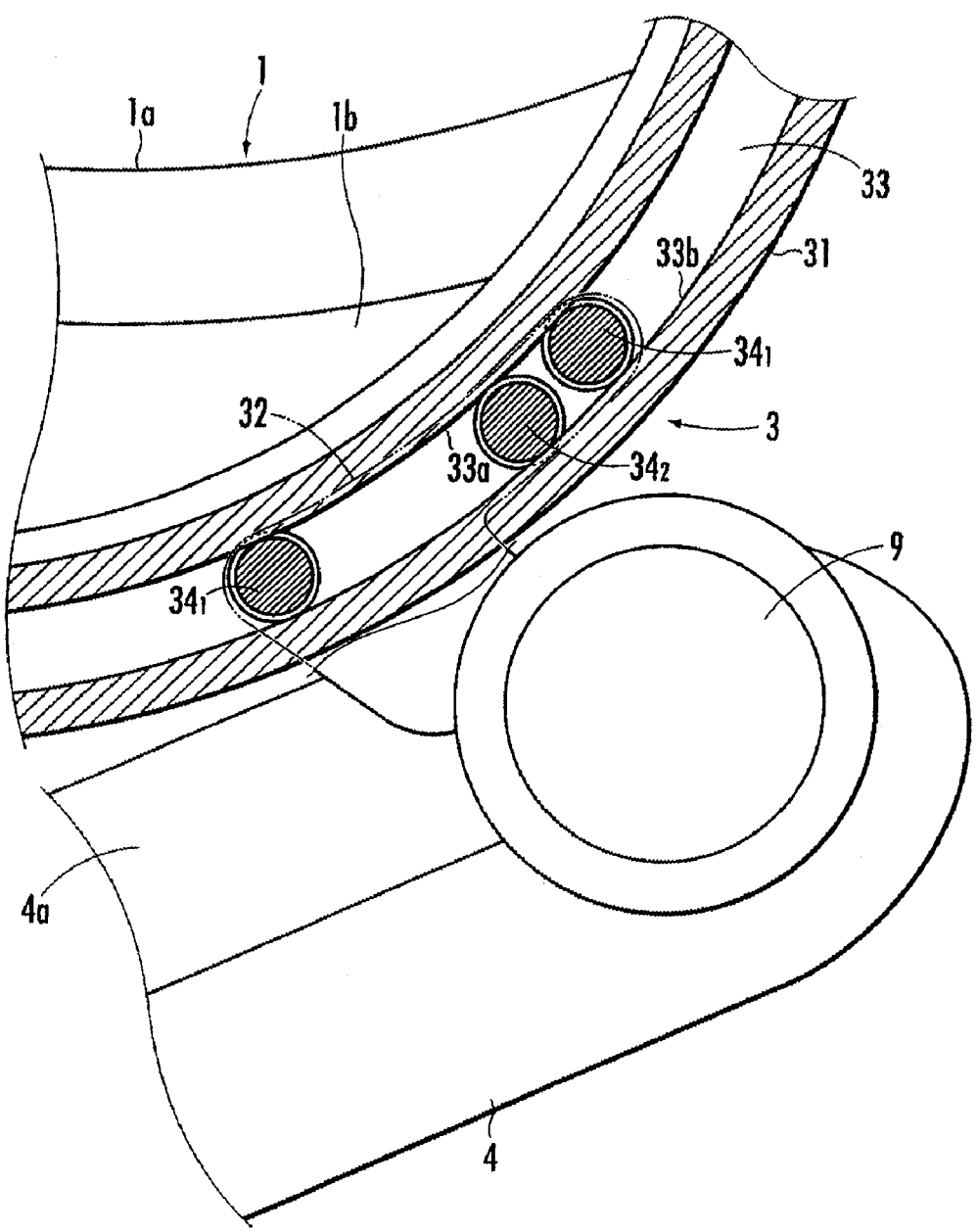
FIG. 6 is a partially cutaway side view of important portions of the walk-assisting device of the second embodiment of the present invention.

Meanwhile, in the above first embodiment, the number of outer rotating bodies $34_2$ provided between the inner rotating bodies $34_1$ and $34_2$ at both ends of the movable body 32 is set to two. However, the number of outer rotating bodies $34_2$ may be one like a second embodiment shown in FIG. 6. In addition, even in the second embodiment, the movable body 32 is arranged so as to be spaced rearward apart from the reference line. In this case, the weight of the user P acts on the seating member 1 in a position ahead of the movable body 32, and a tilt moment in a forward and downward direction is applied to the guide body 31 via the seating member 1.

This tilt moment is received as a pressurization force between the inner rotating body $34_1$ at the front end of the movable body 32 and the inner peripheral rail portion 33a, and between the outer rotating body $34_2$ and the outer peripheral rail portion 33b. This pressurization force decreases as the distance in the front-back directions between the inner rotating body $34_1$ at the front end of the movable body 32 and the outer rotating body $34_2$ is increased. Thus, in the second embodiment, the outer rotating body $34_2$ is provided in a position which is offset in a direction away from the above reference line with respect to a center position between the inner rotating bodies $34_1$ and $34_1$ at both front and rear ends of the movable body 32, i.e., rearward. According to this, the above distance is increased, consequently the pressurization force is decreased, thereby, durability can be improved.

In addition, in a case where the movable body 32 is arranged so as to be forwardly spaced apart from the reference line, a tilt moment in a rearward and downward direction by the weight of the user P is applied to the guide body 31 via the seating member 1. Even in this case, durability can be improved by providing the outer rotating body $34_2$ in a position which is offset in a direction away from the above reference line with respect to the centre position between the inner rotating bodies $34_1$ and $34_1$ at both front and rear ends of the movable body 32, i.e., forward.

Although the embodiment of the invention has been described with reference to the drawings, the invention is not limited thereto. For example, in the above embodiment, the guide groove 33 is formed in the face of the guide unit 31 which is directed laterally outward. However, it is also possible to form the guide groove 33 in the face of the guide unit 31 which is directed laterally inwardly, and to arrange the movable body 32 laterally inside the guide unit 31. According to this configuration, entering of foreign matters, such as trousers, into the guide groove 33 can be more effectively prevented. Additionally, in the above embodiment, engagement elements which are engaged with the inner and outer peripheral rail portions 33a and 33b of the guide groove 31 are constituted by the rotating bodies $34_1$ and $34_2$. However, the engagement elements may be constituted by sliding elements.

Additionally, in the above embodiment, a leg link in which the knee joint portion 5 is located ahead of a user's leg is used as the leg link 2. However, it is also possible to use a leg link in which the knee joint point is located behind a user's leg, and it is also possible to use a leg link having a plurality of joint portions midway. Furthermore, it is also possible to use a retractable link which has a direct-acting-type joint portion midway. Additionally, it is also possible to adopt a configuration in which the foot mounting portion 8 is omitted, the lower end of each leg link 2 is fixedly secured to the lower thigh of each leg of a user by proper means, and the portion of the leg below this fixed portion is used as a reaction force receiver to generate a body weight relieving assist force. Furthermore, in order to assist in walking of a user having an injured leg to fracture, etc., it is also possible to leave only a leg link on the side of the user's injured leg, of the right and left leg links 2 and 2 of the above embodiment, and to omit the other leg link. Additionally, it is also possible to provide a biasing means which biases the knee joint portion 5 in the stretching direction (in the direction in which he seating member 1 is pushed up), and to omit the drive source 9.

Additionally, although the curved guide mechanism 3 of the above embodiment is used for a walk-assisting device, the curved guide mechanism of the invention can also be as a curved guide mechanism for applications other than for the walk-assisting device.

What is claimed is:

1. A curved guide mechanism comprising a guide unit having a guide track of arcuate shape, and a movable body movably engaged with the guide track via a plurality of engagement elements,
    wherein
    the guide track is constituted by a guide groove formed in the guide unit,
    the movable body is provided with at least three engagement elements comprising an inner engagement element movably engaged with an inner peripheral rail portion formed on an inner peripheral side near a center of curvature of the arcuate shape of the guide groove, and an outer engagement element movably engaged with an outer peripheral rail portion formed on an outer peripheral side distant from the center of curvature of the arcuate shape of the guide groove, and
    the engagement elements are spaced apart from one another in a longitudinal direction of the guide groove.

2. The curved guide mechanism according to claim 1,
    wherein the inner engagement elements are provided at one end and the other end of the guide groove of the movable body in the longitudinal direction, respectively, and at least one outer engagement element is provided between the inner engagement elements provided at the two ends, respectively.

3. A walk-assisting device comprising a seating member on which a user sits down in a straddling posture, and a leg link supporting the seating member from below,
    wherein the seating member and the leg link are connected together via a curved guide mechanism including a guide unit connected to the seating member and having a guide track of an arcuate shape, which has a center of curvature above the seating member and is long in front-back directions, and a movable body movably engaged with the guide track via a plurality of engagement elements, and connected to an upper end of the leg link,
    the guide track of the curved guide mechanism is constituted by the guide groove of the arcuate shape which is formed in the guide unit, the movable body is provided with at least three engagement elements including inner engagement elements movably engaged with an inner peripheral rail portion formed on the inner peripheral side near a center of curvature of the arcuate shape of the guide groove, and an outer engagement element movably engaged with an outer peripheral rail portion formed on the outer peripheral side distant from the center of curvature of the arcuate shape of the guide groove, and the engagement elements are spaced apart from one another in a longitudinal direction of the guide groove.

4. The walk-assisting device according to claim 3, wherein the inner engagement elements are respectively provided at one end and the other end of the guide groove of the movable body in the longitudinal direction, respectively, and at least one outer engagement element is provided between the inner engagement elements provided at the two ends, respectively.

5. The walk-assisting device according to claim 4,
    wherein the movable body is arranged so as to be spaced in one direction of the front-back directions from a line which connects a lower end of the leg link and the center of curvature, and the outer and one engagement element is provided in a position offset in a direction away from the line with respect to a centre position between the inner engagement elements provided at the two ends, respectively.

* * * * *